United States Patent
Blissenbach et al.

(10) Patent No.: US 7,843,100 B2
(45) Date of Patent: Nov. 30, 2010

(54) METHODS AND APPARATUS FOR PREVENTING DEMAGNETIZATION IN INTERIOR PERMANENT MAGNET MACHINES

(75) Inventors: Rolf Blissenbach, Rolling Hills Estates, CA (US); Jonathan Bird, Charlotte, NC (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/406,686

(22) Filed: Mar. 18, 2009

(65) Prior Publication Data
US 2010/0237735 A1    Sep. 23, 2010

(51) Int. Cl.
*H02K 7/00*    (2006.01)

(52) U.S. Cl. .............. 310/156.53; 310/156.43; 310/156.56; 310/156.57; 310/156.38

(58) Field of Classification Search ............ 310/43, 310/56, 38, 53, 57, 35, 156.53, 156.43, 156.56, 310/156.57, 156.38
See application file for complete search history.

(56) References Cited

U.S. PATENT DOCUMENTS

| | | | |
|---|---|---|---|
| 2005/0110355 A1* | 5/2005 | Sakuma et al. | 310/156.53 |
| 2006/0061226 A1 | 3/2006 | Kim et al. | |
| 2007/0138892 A1 | 6/2007 | Horst | |
| 2007/0159021 A1* | 7/2007 | Horst | 310/156.53 |

* cited by examiner

*Primary Examiner*—Quyen Leung
*Assistant Examiner*—Terrance Kenerly
(74) *Attorney, Agent, or Firm*—Ingrassia Fisher & Lorenz, P.C.

(57) ABSTRACT

An internal permanent magnet machine ("IPM machine") of the type used, for example, with traction motors and hybrid electric vehicles, includes a rotor having a plurality of ferrite magnets arranged in one or more layers, wherein at least one of the layers includes rare earth magnets (e.g., NdFeB magnets) adjacent to the ferrite magnets to prevent or reduce demagnetization.

20 Claims, 1 Drawing Sheet

METHODS AND APPARATUS FOR PREVENTING DEMAGNETIZATION IN INTERIOR PERMANENT MAGNET MACHINES

TECHNICAL FIELD

The present invention generally relates to magnetic devices such as electrical motors, and more particularly relates to rotors used in connection with interior permanent magnet machines.

BACKGROUND

Interior permanent magnet (IPM) machines are favored for fuel cell and hybrid electric vehicle operations due to their desirable characteristics—good torque density, high overall efficiency, and relatively constant power range, etc. The rotor field in a permanent magnet machine is obtained by virtue of its structure, unlike other machines such as induction, switched or synchronous reluctance machines, in which the field is generated by a stator current supplied by a source. As a result, permanent magnet machines exhibit superior efficiency as compared to other such machines.

An IPM machine typically includes one or more rotor barriers, which include permanent magnets and/or air gaps (which may be filled with a nonmagnetic material). These rotor layers act as barriers to the permanent magnet field of the lower primary magnet layer, reducing the air-gap magnet flux, and lowering the machine back EMF and losses induced by the permanent magnet field.

Traditional IPM rotors are unsatisfactory in a number of respects. For example, it is desirable to use less expensive ferrite magnets in place of rare earth magnets (such as NdFeB) to reduce cost. However, such ferrite magnets are often at risk for demagnetization under certain operating conditions (e.g., low temperature and high d-axis current).

Accordingly, it is desirable to provide improved, low-cost IPM rotor designs with reduced susceptibility to demagnetization. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
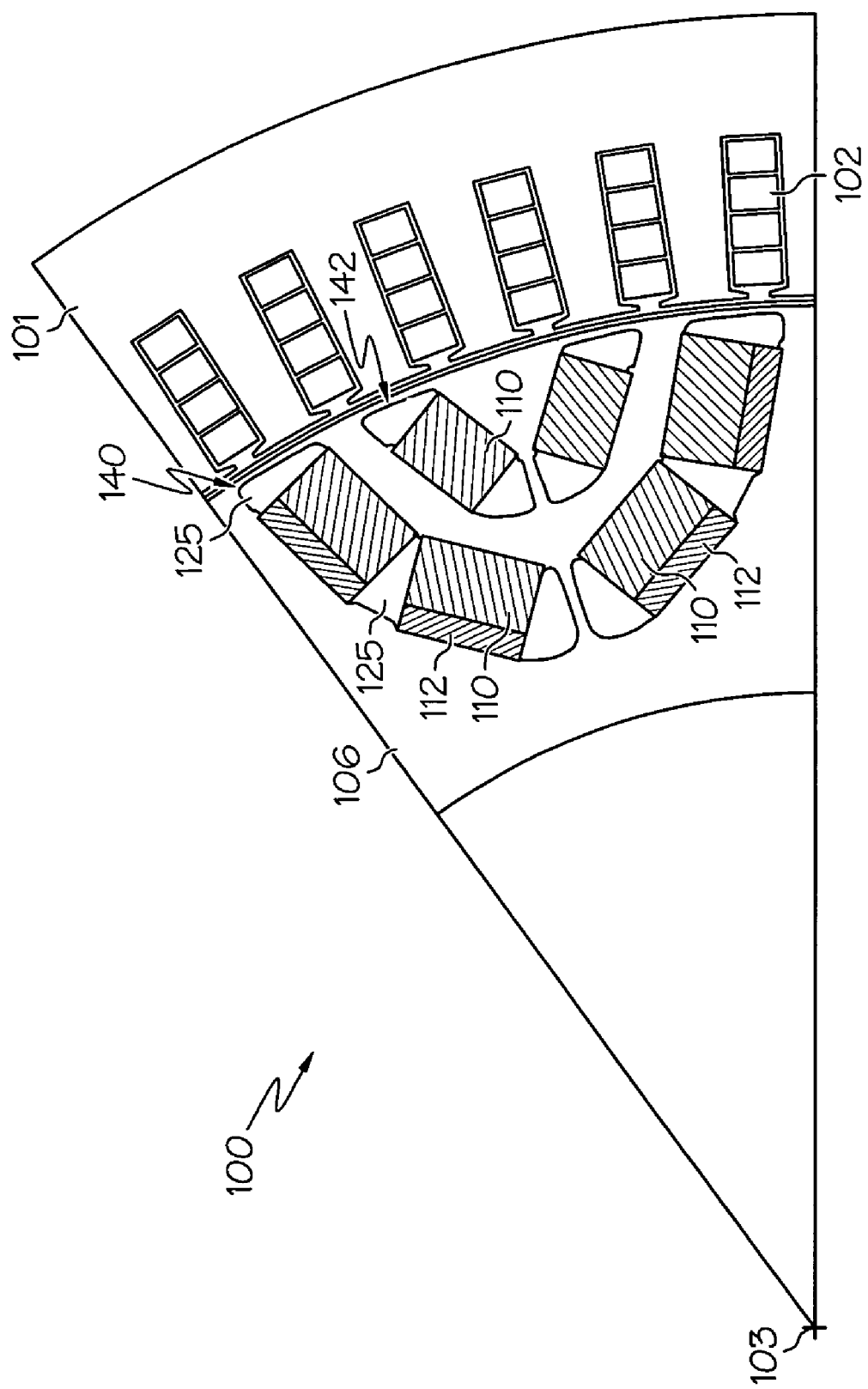
FIG. 1 depicts, in cross-section, a one-eight portion of an IPM machine in accordance with one embodiment.

In general, the present invention is directed to a permanent magnet machine ("PM machine") including a rotor having a plurality of ferrite magnets arranged in one or more layers, wherein at least one of the layers includes rare earth magnets adjacent to the ferrite magnets to prevent or reduce demagnetization.

In this regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to electrical motors, magnetism, and the like are not described in detail herein.

FIG. 1 illustrates an exemplary partial cross-section of an IPM 100 in accordance with one embodiment. As shown, IPM 100 generally includes a rotor 106 configured to rotate with respect to a stator 101 in the conventional manner about a center of rotation 103. IPM 100 includes a stator 101 having a plurality of windings 102 magnetically interacting with magnets 110 disposed within rotor 106 (i.e., inserted within slots or gaps formed therein).

Rotor 106 initially includes a collection of cutouts, slots, or "cavities," each of which are filled with one or more ferrite permanent magnets 110 arranged in one or more layers (e.g., 140 and 142), wherein at least one such layer also includes one or more rare earth magnets 112.

Magnets 110 and 112 may comprise any type of permanent magnet material now known or later developed. In the illustrated embodiment, magnets 110 are composed of traditional sintered ferrite magnet material, as is known in the art. Magnets 112, however, are composed of a sintered rare-earth material such as neodymium iron boron ($Nd_2Fe_{14}B$, or generally "NdFeB").

In the illustrated embodiment, magnets 110 are arranged in two layers—140 and 142—although any number of layers may be provided. The layers are preferably configured as generally arcuate curves oriented convexly outward (i.e., away from center of rotation 103).

The rare earth magnets 112 in second rotor layer (140) have the same shape and size, and are oriented consistent with their respective adjacent ferrite magnets 110. Accordingly, ferrite magnets 110 and rare earth magnets 112 have at least one rectilinear dimension in common such that each pair of magnets fits snuggly within its corresponding cavity. In one embodiment, rare earth magnets 112 are smaller (volumetrically) than their associated ferrite magnets 110.

In the illustrated embodiment, rare earth magnets 112 are located at the "bottom" of the lowest layer 140—i.e., in the critical region for demagnetization (i.e., closest to center of rotation 112). It will be appreciated, however, that other configurations of rare earth magnets 112 that prevent or reduce demagnetization of ferrite magnets 110 may also be employed.

Each layer comprises two symmetrically disposed cavities, and may include any number of magnets 110. In this embodiment, layer 140 includes four ferrite magnets 110 and four rare earth magnets 112, and layer 142 includes two ferrite magnets 110 magnets. Each adjacent pair of magnets may be separated by an air gap 125 or other non-magnetic material (e.g., plastic or the like).

Rectangular magnets are significantly easier to manufacture than more complicated shapes, as they are characterized by straight edges, sharp corners, tighter tolerances, and easy-to-measure geometries. Furthermore, such magnets are easier and cheaper to mass produce. Accordingly, it is desirable for magnets 110 to have substantially the same shape (in this embodiment, rectangular or rectilinear). While the figures illustrate a two-dimensional cross-sectional view of magnets 110, it will be understood that cavities 107 extends into rotor 106 and will define a three-dimensional volume having any suitable shape.

In accordance with an alternate embodiment, a suitable coating (metallic, composite, etc.) may be placed on the ferrite and/or rare earth magnets to prevent unwanted surface interaction or other issues arising from having two magnets in contact with each other.

The structures described above are advantageous in a number of respects. In particular, relatively inexpensive ferrite magnets 110 can be used for the bulk of the magnets within each rotor layer, while at the same time demagnetization can be prevented by using smaller, more expensive rare earth magnets (e.g., NdFeB magnets) within one or more layers to prevent demagnetization in critical regions.

And while at least one example embodiment has been presented in the foregoing detailed description, it should be appreciated that a vast number of variations exist. For example, additional barrier layers may be incorporated in addition to the single layer illustrated. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. An interior permanent magnet machine comprising:
a wound stator;
a rotor configured to magnetically interact with the wound stator;
a plurality of cavities provided within the rotor;
a plurality of magnets provided within the plurality of cavities, wherein the plurality of magnets includes a set of ferrite magnets and a set of associated rare earth magnets configured to prevent demagnetization of the ferrite magnets, wherein the distance between the set of rare earth magnets and a center of rotation of the rotor is less than the distance between the set of ferrite magnets and the center of rotation;
wherein the total volume of each cavity is only partially filled by the plurality of magnets, such air gaps or nonmagnetic regions are formed on each side of the ferrite magnets and on each side of the rare earth magnets; and
wherein each ferrite magnet is paired with, and positioned symmetrically with respect to, a selected one of the rare earth magnets.

2. The interior permanent magnet machine of claim 1, wherein the ferrite magnets are equal-sized and substantially rectangular.

3. The interior permanent magnet machine of claim 1, wherein the rare earth magnets are equal-sized and substantially rectangular.

4. The interior permanent magnet machine of claim 1, wherein the plurality of magnets are distributed in layers.

5. The interior permanent magnet machine of claim 3, wherein a lower layer includes the rare earth magnets.

6. The interior permanent magnet machine of claim 1, wherein the rare earth magnets are NdFeB magnets.

7. A method of manufacturing an interior permanent magnet machine, the method comprising:
providing a wound stator;
providing a rotor;
forming a plurality of cavities within the rotor;
providing a plurality of ferrite magnets and a plurality of rare earth magnets within the rotor such that demagnetization of the ferrite magnets is prevented by the rare earth magnets and the distance between the set of rare earth magnets and a center of rotation of the rotor is less than the distance between the set of ferrite magnets and the center of rotation; and
placing the wound stator in magnetic interaction with the rotor;
wherein the total volume of each cavity is only partially filled by the plurality of magnets, such that air gaps are formed adjacent to each side of the rare earth magnets and each side of the ferrite magnets; and
wherein each ferrite magnet is paired with, and positioned symmetrically with respect to, a selected one of the rare earth magnets.

8. The method of claim 7, wherein the ferrite magnets are equal-sized and substantially rectangular.

9. The method of claim 7, wherein the rare earth magnets are equal-sized and substantially rectangular.

10. The method of claim 7, wherein the plurality of magnets are distributed in layers.

11. The method of claim 10, wherein a lower layer includes the rare earth magnets.

12. The method of claim 7, wherein the rare earth magnets are NdFeB magnets.

13. A fraction motor configured to be used in connection with a vehicle, the traction motor comprising a rotor, a stator, and a plurality of a ferrite magnets and rare earth magnets inserted within a plurality of cavities of the rotor such that demagnetization of the ferrite magnets is prevented by the rare earth magnets and wherein the distance between the set of rare earth magnets and a center of rotation of the rotor is less than the distance between the set of ferrite magnets and the center of rotation, wherein the total volume of each cavity is only partially filled by the plurality of magnets, such that air gaps are formed adjacent to each side of the rare earth magnets and each side of the ferrite magnets, and wherein each ferrite magnet is paired with, and positioned symmetrically with respect to, a selected one of the rare earth magnets.

14. The traction motor of claim 13, wherein the ferrite magnets are equal-sized and substantially rectangular.

15. The traction motor of claim 13, wherein the rare earth magnets are equal-sized and substantially rectangular.

16. The traction motor of claim 13, wherein the plurality of magnets are distributed in layers.

17. The traction motor of claim 16, wherein a lower layer includes a plurality of pairs of the rare earth magnets and ferrite magnets.

18. The traction motor of claim 13, wherein the rare earth magnets are NdFeB magnets.

19. The interior permanent magnet machine of claim 1, wherein each ferrite magnets and its corresponding rare earth magnet have substantially the same width and contact each along a linear edge.

20. The method of claim 7, wherein each ferrite magnets and its corresponding rare earth magnet have substantially the same width and contact each along a linear edge.

* * * * *